Nov. 5, 1968    O. H. AMUNDSON    3,408,687
CHAIN TIGHTENER FOR FRANKFURTER LINKER CHAIN
Filed April 26, 1966
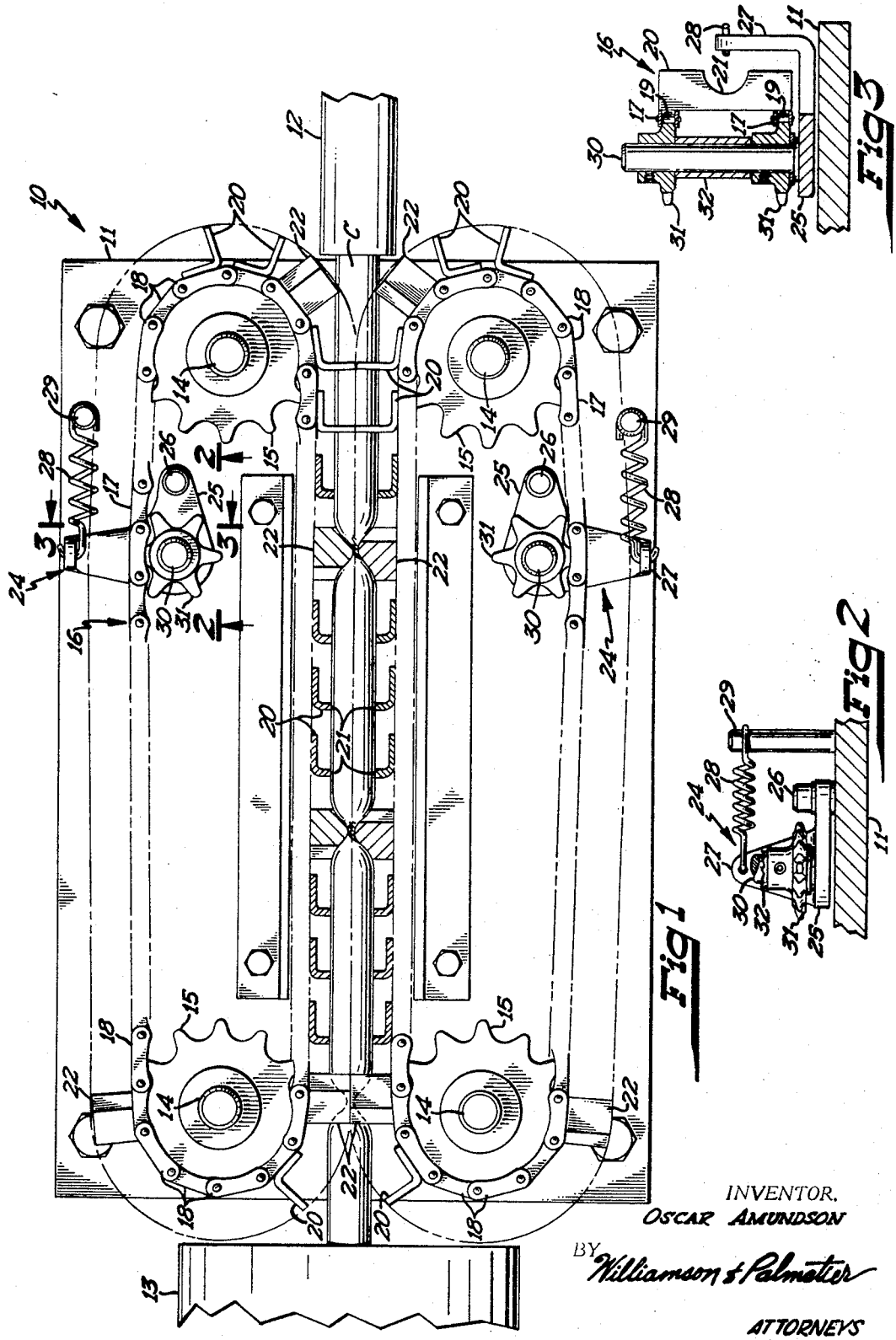
INVENTOR.
OSCAR AMUNDSON
BY Williamson & Palmatier
ATTORNEYS

United States Patent Office 3,408,687
Patented Nov. 5, 1968

3,408,687
CHAIN TIGHTENER FOR FRANKFURTER LINKER CHAIN
Oscar H. Amundson, Austin, Minn., assignor to Geo. A. Hormel & Company, Austin, Minn., a corporation of Delaware
Filed Apr. 26, 1966, Ser. No. 545,308
3 Claims. (Cl. 17—34)

ABSTRACT OF THE DISCLOSURE

A pair of tensioning mechanisms for use with a link forming device employed in forming elongate meat stuff casing into a plurality of links. The link forming device, including a pair of endless chain members trained about sprockets and each having guide elements thereon and a plurality of pincher elements thereon to grip and constrict the stuff casing as it passes between parallel proximal runs of the chain members. The tensioning mechanism serving to maintain the chain members in a tensioned condition without effecting the synchronized movement of the chain members.

---

In recent years, apparatus has been developed for automatically forming meat stuffed casings into links of predetermined size, the apparatus including pincher elements mounted on driven endless chains between which the meat stuffed casing to be linked is passed. A pincher element on one of the chains cooperates with a pincher element on the other of said chains to grip, and constrict the stuffed casing at a selected point so that when the casing is revolved or twisted, a link of predetermined size is formed. It is necessary that the chains be driven at the same velocity and that the original setting thereof be maintained so that cooperating pairs of pincher elements will always be properly positioned for producing the link forming function. It has been found that during operation of the link forming device for extended periods of time, the chains carrying the gripping members occasionally run out of sequence with respect to each other so that the pincher elements no longer mate with each other to perform the linking function. This occurs when one or both of the chain members becomes slightly loose with respect to the sprockets about which they are trained.

An object of the present invention is to provide a link forming device with tensioning means to constantly exert a tension on the chains thereof so that the chains will be maintained in a preset predetermined time sequence of operation. Specifically, the link forming device is provided with a tensioning mechanism for each chain without requiring alteration of the present link forming structure. The tensioning device may also be applied in a manner so that it will not interfere with the functioning of the link forming device but will maintain the chain members thereof in a tensioned condition to prevent slippage with respect to the sprocket thereof.

These and other objects and advantages of the invention will more fully appear from the following description made in connection with the accompanying drawings, wherein like character references refer to the same or similar parts throughout the several views, and in which:

FIG. 1 is a top plan view of a link forming device incorporating the tensioning mechanism;

FIG. 2 is a cross sectional view taken approximately along line 2—2 of FIG. 1 and looking in the direction of the arrows; and FIG. 3 is a cross sectional view taken approximately along line 3—3 of FIG. 1 and looking in the direction of the arrows.

Referring now to the drawing and more specifically to FIG. 1 it will be seen that one embodiment of the link forming device designated generally by the reference numeral 10 is thereshown. This link forming device 10 includes a support 11 in the form of a generally flat rectangular shaped plate. The link forming device is adapted to be positioned between a revolving sleeve 12 and a revolving receiving basket 13, the latter receiving the linked casing and serving to position the same upon a conveyor which moves the linked casing to a cooking chamber. The interior surface of the revolving sleeve 12 engages the exterior surface of the unlinked casing to revolve the same as it is discharged therefrom.

The link forming device 10 includes a plurality of sprocket pins or axles 14 each mounted upon the support 11 in upstanding relation therewith, said pins 14 being arranged in longitudinally aligned pairs. The sprocket axles 14 have sprockets 15 keyed thereto, the sprockets on each pair of longitudinally aligned axles 14 having an endless chain member 16 trained thereabout. Each of the chain members 16 is comprised of a pair of endless roller chains 17 disposed in side by side relation and each including a plurality of links 18 pivotally interconnected by rollers 19. The endless roller chain comprising each chain member are interconnected by a plurality of substantially identical longitudinally spaced apart guide and support elements 20 which extend transversely of the chain members and at substantially right angles to the direction of travel thereof. It will be noted that each of the guide support elements 20 has an arcuate centrally located outer gripping surface 21 which serves to support and grip the casing as the casing is moved through the link forming device.

To this end it will be seen that the chain members are disposed so that one run of each chain member is disposed in close proximity to and substantially parallel relation with respect to one run of the other chain member. The guide and support elements 20 on these closely proximal parallel runs cooperate with each other to engage and support opposite arcuate surfaces of the casing C as it is discharged through the revolving sleeve 12. These guide and support elements 20 do not tightly grip the casing but form a relatively loose support for the same as it is moved through the link forming device.

Means are provided, however, for very tightly gripping and pinching the casing at predetermined points along the links thereof and which cooperates with the revolving sleeve 12 to form the casing into links. This means includes a plurality of pincher elements 22 which are disposed in transverse but oblique relation with respect to the direction of travel of the parallel runs of the chain members and each of these pincher elements 22 has a concave outer surface 23 thereon. Pairs of these pincher elements 22 mate with each other at the beginning of the parallel proximal runs of the chain members adjacent the sleeve 12 so that the concave surfaces thereof interengage the casing and are retained in engaging relation with the casing throughout the parallel runs. When urged into mating relation with respect to each other the pincher elements constrict the casing as shown in FIG. 1 and very tightly grip the same whereby as the sleeve 12 revolves the unlinked casing C, the casing will be twisted and the links will be formed. Chain members having different spacing between adjacent pincher elements 22 may be provided so that the length of the links may be varied. The drive of the chain members is preset so that the pincher elements 22 do mate at the beginning of the parallel proximal run adjacent the sleeve 12 and in the event the chain becomes loose through usage, the chain members will run out of phase with respect to each other and there will be a mismatching or mismating of these pincher elements.

Means are, therefore, provided for exerting constant and uniform tension on the chain members and specifically on those runs located oppositely of the proximal parallel runs. It will be seen that a pair of tensioning mechanisms designated generally by reference numeral 24 are provided each engaging and serving to tension one of the chain members 16. Each tensioning mechanisms 24 includes an arm 25 which is pivotally mounted on the support 11 by means of a pivot pin 26 to permit horizontal swinging movement of the arm 25 about a substantially vertical axis. It is pointed out that the support plate 11 is normally horizontally oriented and it will be seen that the arm 25 is of L-shaped or bell crank configuration. The outer end of one of the legs of the arm 25 is bent upwardly as at 27 and this upwardly bent portion has an aperture therein in which is disposed one end of a helical coil spring 28. The other end of the coil spring 28 is attached to an upstanding post 29 also mounted on the support 11. It will be noted that the arm 25 extends below the chain member 16.

Arm 25 has an upstanding post 30 mounted thereon for movement therewith and has a pair of relatively small vertically spaced apart sprockets 31 mounted on the post for rotation therewith. The spacer sleeve 32 may be disposed in concentric relation around the post 30 to suitably space the sprockets 31 from each other. It will be seen that the spring 28 for each tensioning mechanism urges the arm 25 about its axis 26 in a direction so that the sprockets 31 carried thereby are constantly urged into engaging relation with the chain member 16. Thus the sprockets tend to constantly but yieldably tension the spring 16 so that the chain member will be urged into tight but engaging relation with respect to the sprockets 15. It is pointed out that one sprocket of each set associated with the chain member 16 will be driven in a direction so that the tubular stuffed casing will be moved therebetween toward the revolving basket. Since the tensioning mechanism for each chain member is constantly urged in a direction to tension the latter, it will be seen that there will be little slippage of the chain members and the tendency of the chain members to become out of phase with respect to each other will be minimized if not completely eliminated. Thus the tensioning mechanism serves to very effectively improve the operating efficiency of the link forming device and substantially eliminates one of the operational problems associated therewith.

It will, therefore, be seen that I have provided a novel tensioning mechanism for a link forming apparatus which is not only of simple and inexpensive construction but one which functions in a more efficient manner than any heretofore known comparable device.

It will, of course, be understood that various changes may be made in the form, details, arrangement and proportions of the various parts without departing from the scope of my invention.

What is claimed is:

1. In a link forming device for forming an elongate meat stuff casing into a plurality of links, said device comprising a horizontal support, a plurality of sprockets revolvably mounted on said support and arranged in pairs, a pair of endless chain members disposed in laterally spaced apart relation and each being trained about a pair of said sprockets, at least one sprocket for each chain member being driven, each chain member including an inner run and an outer run disposed in parallel relation with each other, the inner run of each of said chain members being disposed in close proximity to but laterally spaced from and in parallel relation to the inner run of the other chain members, each chain member comprising a pair of vertically spaced apart endless chains arranged in upper and lower relation, said chains of each chain member being interconnected by a plurality of longitudinally spaced apart pincher elements, each pincher element on one pair of chains mating with a pincher element on the other pair of chains to grip and constrict the stuffed casing as it is passed between said parallel proximal runs of said chain members whereby the casing when revolved about its longitudinal axis, will be formed into links, a pair of tensioning mechanisms each including a pair of chain tightening idler sprockets engaging the chains of one of said chain members at the outer run of the latter, yieldable means interconnected with each of chain tightening idler sprockets to cause each pair of sprockets to be urged constantly as a unit in a direction to tighten and tension the associated chain member.

2. The link forming device as defined in claim 1 wherein said yieldable means for each of said tensioning mechanisms includes an arm pivotally mounted on said support for pivotal movement relative thereto about a substantially vertical axis, said pair of tightening sprockets of each tensioning mechanism being mounted on one of said arms for movement therewith, and a coil spring connected with said associated arm.

3. The link forming device as defined in claim 2 wherein said arm of each tensioning mechanism is positioned within the confines of the associated chain member and projects outwardly therefrom.

References Cited

UNITED STATES PATENTS

| | | | |
|---|---|---|---|
| 1,504,010 | 8/1924 | Zdechlik | 17—34 |
| 2,853,179 | 9/1958 | Norin | 198—208 X |
| 3,115,668 | 12/1963 | Townsend | 17—33 |
| 3,181,691 | 5/1965 | Kagley | 198—208 |

LUCIE H. LAUDENSLAGER, *Primary Examiner.*